(No Model.) 2 Sheets—Sheet 1.

T. M. FOOTE.
REVERSING GEAR FOR ELECTRIC CARS.

No. 433,402. Patented July 29, 1890.

WITNESSES.
Matthew M. Blunt
Charles J. Pillsbury

INVENTOR.
Theodore M. Foote
by his attorney
Alex. L. Hayes (No Model.) 2 Sheets—Sheet 2.
T. M. FOOTE.
REVERSING GEAR FOR ELECTRIC CARS.

No. 433,402. Patented July 29, 1890.

WITNESSES.
Matthew M. Blunt
Charles J. Pillsbury

INVENTOR.
Theodore M. Foote
by his attorney
Aby. L. Hayes

UNITED STATES PATENT OFFICE.

THEODORE M. FOOTE, OF BOSTON, MASSACHUSETTS.

REVERSING-GEAR FOR ELECTRIC CARS.

SPECIFICATION forming part of Letters Patent No. 433,402, dated July 29, 1890.

Application filed November 6, 1889. Serial No. 329,427. (No model.)

*To all whom it may concern:*

Be it known that I, THEODORE M. FOOTE, of Boston, in the county of Suffolk and State of Massachusetts, have invented a new and useful Improvement in Reversing-Gearing for Electric Cars, of which the following, taken in connection with the accompanying drawings, is a specification.

In an application for Letters Patent of the United States filed by me July 18, 1889, Serial No. 317,879, I have described and claimed a magnetic coupling for electric motors, whereby, while maintaining the motor at a constant speed of rotation, I am enabled to connect it at will to the work, and I have shown this device as applied to an electric motor used for operating a street-car. In this device there is a collar or magnetic metal loose upon the motor-shaft and connected to the work, a collar of magnetic metal rotating with the motor-shaft in proximity to the loose collar, and means for magnetizing either or both collars, so as to cause a frictional contact between them by magnetic attraction.

The invention which forms the subject of the present application for a patent of the United States has for its object the utilization of this magnetic coupling to obtain a device whereby it is rendered possible to reverse the direction of the rotation of the car-axle at will without reversing the direction of the rotation of the motor; and to this end the invention consists of the combination, substantially as hereinafter more fully set forth, with the motor-shaft, of two sets of magnetic coupling upon the same, two sets of gearing, each connecting the motor to the work by means of a magnetic coupling, but rotating in reverse direction, a circuit passing through the coils of each coupling, and a device for determining the direction of a current through the coils of either coupling at will to effect the magnetization of the same.

In the accompanying drawings I have shown this device as applied to an electric car.

Figure 1:
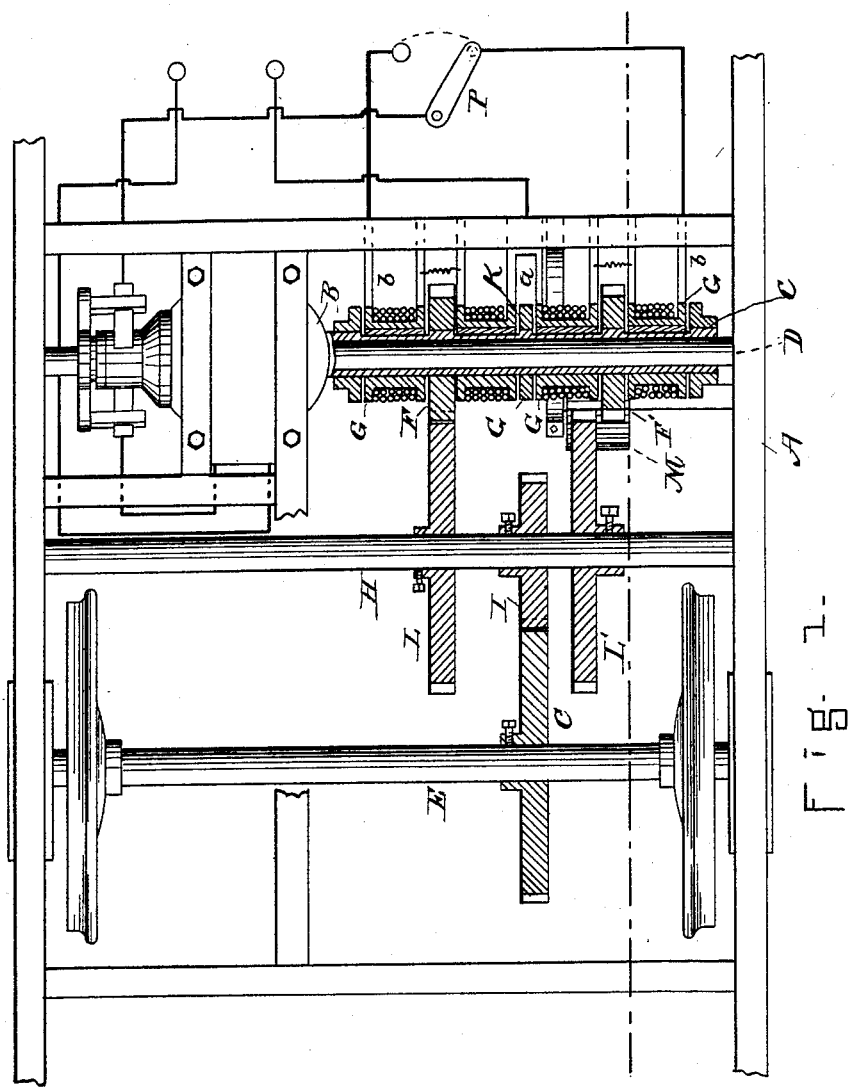
Figure 2:
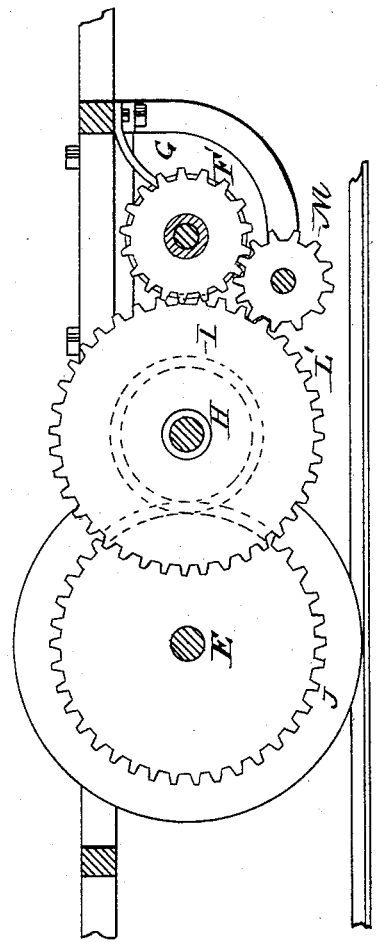

In the drawings, Figure 1 is a view of the truck, partly in plan and partly in section; and Fig. 2 is a vertical sectional view.

The form of motor which I have shown as used with this device is that which is described and claimed in an application for Letters Patent of the United States filed by me July 18, 1889, Serial No. 317,880, in which motor the armature is mounted upon a sleeve, which rotates upon a fixed shaft; but any other form of motor may be used.

Referring to the drawings, A is the car-truck.

B is the motor.

C is the rotating sleeve.

D is the fixed shaft, and E is the axle of the car-wheels.

Upon the sleeve are two loose collars of magnetic metal F F', and on each side of each of these loose collars is a collar G, of magnetic metal, rotating with the sleeve, but capable of longitudinal movement upon the same. These collars are magnetized by means of coils upon the same, which are traversed by an electric circuit. Between the pairs of collars is a collar K, of non-magnetic metal, fixed upon the sleeve.

H is a counter-shaft, which carries a pinion I, which gears with a gear-wheel J upon the car-axle. Upon the counter-shaft are also two gear-wheels L L', one of which L gears directly with the collar F, and the other gears with the collar F' through a pinion M, so that when the collar F' rotates the car-axle is caused to rotate in a reverse direction to that which it has when the collar F rotates. One of the terminals of the generator is connected to a strip of metal $a$, which bears upon the collar K, and the current passes through the coils upon the collars G to springs $b$, which bear upon the collars and are connected in the circuit. A switch P, with suitable connections, is provided, by means of which the current can be caused to pass at will through either of the sets of couplings. When the coils adjacent to the loose collar F are magnetized, the fixed collars adhere to the loose collar, and the rotating sleeve is connected to the work through the gear-wheel L; but when the current is caused to pass through the coils adjacent to the collar F' the fixed collars on each side adhere to the loose collar F', and the rotating sleeve is connected to the work through the pinion M and gear-wheel L', thus reversing the direction of the rotation of counter-shaft I and shaft E connected therewith. It will thus be seen that the direction of the rotation of the car-axle can be reversed at will without changing the direction of the rotation of the motor.

I do not limit myself to the arrangement of a collar on each side of the loose collar; but I may have only one fixed collar, and I may have the magnetizing-coils on the loose collar, as set forth in application, Serial No. 317,879, before referred to. I may also use any other form of gearing.

Having thus described my invention, what I claim, and desire to secure by Letters Patent of the United States, is—

1. The combination of a dynamo-electric motor, two sets of magnetizable collars on the motor-shaft, one collar of each set being loose on the shaft and the other being fixed to rotate therewith and adapted to slide longitudinally thereon, and one collar of each set being provided with a magnetizing-coil, electric circuits passing through said coils, a switch for changing the current from one set of collars to the other set, a counter-shaft provided with two gear-wheels, one of which gears directly with one of said loose collars, and an intermediate gear which gears with the other of said gear-wheels and with the other of said loose collars, substantially as described.

2. The combination, substantially as and for the purpose set forth, with the rotating-shaft of an electric motor, of two collars of magnetic metal loose upon this shaft and each geared to the work to operate the same in a reverse direction, two sets of collars capable of being magnetized upon the motor-shaft and rotating with it, and having a longitudinal movement on the same, and each acting when magnetized to establish a frictional contact with one of the loose collars, coils for magnetizing these fixed collars, a source of electrical energy, electric circuits from this source of energy, each passing, respectively, through coils upon one set of fixed collars, and a device for establishing at will an electrical connection between the source of electrical energy and the coils of either of the sets of fixed collars.

3. The combination, substantially as and for the purpose set forth, of the motor C, the rotating sleeve D, the collars F F', of magnetic metal, loose upon the same, each geared to the work to operate the same in a different direction, the collars G G G G, of magnetic metal, rotating with the sleeve, but capable of longitudinal movement on the same, magnetizing-coils on these collars, the collar K, the spring a, bearing upon the same, the springs b b, bearing upon the fixed collars, a source of electric energy, electric circuits passing from the generator and through the coils upon each set of fixed collars, and means for establishing at will an electric circuit through the coils of either set of collars.

4. The combination, substantially as and for the purpose set forth, of the motor B, the rotating sleeve C, the loose collars F' F'', loose upon the sleeve, the collars G G G G, of magnetic metal, one on each side of one of the loose collars, rotating with the shaft, but capable of a longitudinal movement on the same, magnetizing-coils upon the fixed collars, means for magnetizing at will either pair of the fixed collars, whereby by magnetic attraction a frictional contact is established between each of the loose collars and the fixed collars, the counter-shaft H, gearing with the car-axle, the wheel L, and the wheel L' and pinion M.

In testimony whereof I have signed my name to this specification, in the presence of two subscribing witnesses, on this 4th day of November, A. D. 1889.

THEODORE M. FOOTE.

Witnesses:
ALEX. L. HAYES,
CHARLES J. PILLSBURY.